(12) United States Patent
Raber

(10) Patent No.: US 9,810,270 B2
(45) Date of Patent: Nov. 7, 2017

(54) CLUTCH DEVICE

(71) Applicant: Schaeffler Technologies AG & Co. KG, Herzogenaurach (DE)

(72) Inventor: Christoph Raber, Ottersweiler-Steinbach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 15/038,341

(22) PCT Filed: Oct. 22, 2014

(86) PCT No.: PCT/DE2014/200580
§ 371 (c)(1),
(2) Date: May 20, 2016

(87) PCT Pub. No.: WO2015/078458
PCT Pub. Date: Jun. 4, 2015

(65) Prior Publication Data
US 2016/0290414 A1    Oct. 6, 2016

(30) Foreign Application Priority Data

Nov. 28, 2013 (DE) ........................ 10 2013 224 328

(51) Int. Cl.
*F16D 13/75* (2006.01)
(52) U.S. Cl.
CPC .................................. *F16D 13/757* (2013.01)
(58) Field of Classification Search
USPC .......................................... 192/111.18, 111.5
See application file for complete search history.

(56) References Cited

U.S. PATENT DOCUMENTS 5,069,322 A * 12/1991 Mizukami et al. ... F16D 13/757
                                                    192/111.2
5,540,313 A *  7/1996 Weidinger .............. F16D 65/52
                                                    192/111.3
6,371,269 B1   4/2002 Weidinger
                        (Continued)

FOREIGN PATENT DOCUMENTS

DE          19922724      11/2000
DE        102008037796     2/2009
                        (Continued)

*Primary Examiner* — Mark Manley
(74) *Attorney, Agent, or Firm* — Davidson, Davidson & Kappel, LLC

(57) ABSTRACT

A clutch device having at least one counter-pressure plate, a contact plate that is movable relative to the counter-pressure plate to a limited extent in an axial direction of the clutch device to frictionally clamp a clutch plate between the counter-pressure plate and the contact plate, and a wear adjustment device to compensate for wearing of the clutch plate, where the wear adjustment device has at least one drive ring which is rotatable and is clampable in the axial direction and at least one ramp ring which is rotatable and is clampable in the axial direction, which is connected to the drive ring by means of a torque-transferring link which permits limited relative travel in the circumferential direction of the clutch device, where the rigidity of the connection in the circumferential direction is dependent on the direction, is provided.

17 Claims, 4 Drawing Sheets

(56) References Cited

U.S. PATENT DOCUMENTS 8,381,890 B2    2/2013   Raber
9,115,767 B2    8/2015   Wakabayashi et al.

FOREIGN PATENT DOCUMENTS

| DE | 10 2009 035 225 A1 | 2/2010 |
|----|---------------------|--------|
| DE | 102010006054 | 8/2010 |
| DE | 202012100856 | 3/2012 |
| DE | 102012204245 | 10/2012 |
| DE | 112011102760 | 9/2013 |

\* cited by examiner

CLUTCH DEVICE

The invention relates to a clutch device, in particular a single or dual clutch, in particular for a motor vehicle.

BACKGROUND

From DE 10 2009 035 225 A1 a clutch device is known, having a counter-pressure plate, a contact plate that is movable relative to the counter-pressure plate to a limited extent in an axial direction of the clutch device to frictionally clamp a clutch plate between the counter-pressure plate and the contact plate, and a wear adjustment device to compensate for wearing of the clutch plate. The wear adjustment device contains a rotatable adjusting ring, and a rotatably supported spindle drive with a drive pinion having a tooth structure, which acts on the adjusting ring. In the event of wear, a drive pawl which can be brought into engagement with the tooth structure of the drive pinion turns the spindle drive, whereby the adjusting ring, which is operationally connected to the spindle drive, is turned in order to compensate for the wear of the clutch plate.

Since, in the event of wear, the turning of the drive pinion is dependent on the detected wear distance, i.e., dependent on the additional distance by which the contact plate must move nearer to the counter-pressure plate in order to clamp the now thinner clutch plate frictionally between the contact plate and the counter-pressure plate, the previously explained wear adjustment device is also referred to as a travel-based wear adjustment device.

SUMMARY OF THE INVENTION

It is an object of the present invention to provide a clutch device having a wear adjustment device, in particular power-based, wherein not the engaging force but the clamping force can be detected and can be used as a parameter for wear adjustment.

The present invention provides a clutch device having at least one counter-pressure plate, a contact plate that is movable relative to the counter-pressure plate to a limited extent in an axial direction of the clutch device to frictionally clamp a clutch plate between the counter-pressure plate and the contact plate, and a wear adjustment device to compensate for wearing of the clutch plate, where the wear adjustment device has at least one drive ring which is rotatable and is clampable in the axial direction and at least one ramp ring which is rotatable and is clampable in the axial direction, which is connected to the drive ring by means of a torque-transferring link which permits limited relative travel in the circumferential direction of the clutch device, where the rigidity of the connection in the circumferential direction is dependent on the direction.

Because of the link, whose rigidity in the circumferential direction is dependent on the direction, i.e., which has a different rigidity when moving clockwise than when moving counter-clockwise, no additional spring energy is necessary for the wear adjustment device to adjust for wear. Similarly to the previously described travel-based wear adjustment device, the energy for adjusting for wear can be drawn from the travel of the contact plate, in particular from the energy of the leaf springs that pre-stress the contact plate in the disengagement direction. Thus, when the wear of the clutch plate has been detected, no additional energy sources, such as an adjusting ring which is spring-pre-stressed in the circumferential direction relative to the contact plate or the clutch housing, are necessary in order to readjust for the clutch wear. In particular, the clutch device is designed as a single or dual clutch, preferably for a motor vehicle.

Preferably by means of leaf springs distributed in the circumferential direction, the contact plate is situated non-rotatingly in a clutch housing of the clutch device and is movable to a limited extent in the axial direction relative to the counter-pressure plate, while the counter-pressure plate is fixed relative to the housing. When the clutch plate is clamped between the contact plate and the counter-pressure plate, with the clutch device in the engaged state, frictional transfer of the torque takes place from the input side of the clutch device through the contact plate and the counter-pressure plate to the clutch plate, and from the clutch plate to the output side of the clutch device, for example to the input shaft of a transmission.

The clutch can be engaged or disengaged by means of a lever element, which is acted on by an actuator device. The lever device may be a diaphragm spring, as customarily used in normally engaged clutch devices, or a lever spring, as customarily used in normally disengaged clutch devices.

If the clutch device is designed as a normally engaged clutch device, in the non-actuated state the force of the engaging diaphragm spring that acts on the contact plate outweighs the force of the disengaging leaf springs that act on the contact plate. During actuation, the diaphragm spring is subjected by the actuator device to a force by which the clutch is disengaged. On the other hand, however, the clutch device may also be designed as a normally disengaged clutch device; that is, as a clutch in which, in the non-actuated state, the force of the disengaging leaf springs that act on the contact plate outweighs the force of the lever spring that acts on the contact plate. During actuation, the lever spring is subjected by the actuator device to a force by which the clutch is engaged.

The clutch device may be designed equally as a push clutch device, that is, as a clutch device in which the actuator device exerts a pressing force on the diaphragm spring or lever spring, or as a pull clutch device, that is, as a clutch device in which the actuator device exerts a pulling force on the diaphragm spring or lever spring. Furthermore, the clutch may be designed, on the one hand, as a dry clutch and, on the other hand, as a wet clutch.

Moreover, the clutch device may be designed as a single clutch, that is, it may have a single torque transfer device with a contact plate, a counter-pressure plate and a clutch plate that is clampable between them, but it may also be designed as a multiple clutch, in particular as a dual clutch. The dual clutch may have two separate torque transfer devices, but may also have two torque transfer devices that share a common counter-pressure plate, which is also referred to in this connection as a central plate.

The ramp ring of the wear adjustment device is supported rotatingly around an axis of rotation of the clutch device and is supported clampably in the axial direction of the clutch device between the contact plate and the lever element, in particular a force rim of the diaphragm spring or lever spring. On its surface facing away from the lever element, the ramp ring has ramps which are situated so that they can slide on opposing ramps, so that during a relative turning of the ramp ring the ramps of the ramp ring slide along the opposing ramps, which changes the distance between the contact plate and the surface of the ramp ring facing away from the contact plate with which the ramp ring is in contact with the lever element. The opposing ramps are preferably made in a single piece with the contact plate, and in particular are set into the contact plate.

Preferably positioned in the radial direction inside the ramp ring is the drive ring, which is connected to the ramp ring by means of at least one torque-transferring link which allows limited relative travel in the circumferential direction of the clutch device. In contrast to the ramp ring, the drive ring has no ramps, but rather rests essentially flat against the contact plate on the surface of the contact plate facing away from the clutch plate. On its other side, the drive ring rests essentially flat against the surface of the lever element facing toward the contact plate or the clutch plate.

The wear adjustment device preferably has a sensor spring, which is designed to clamp the drive ring in the axial direction when the clutch device is engaged, in either the wear-free or the wear-adjusted state of the clutch device. To this end, the sensor spring rests against the lever element, preferably at the same radius as the drive ring, but on the opposite side in the axial direction; that is, preferably on the surface of the lever element facing away from the contact plate or the clutch plate. This contact may be direct, but may also occur indirectly, for example by means of a force ring positioned between the sensor spring and the lever element. Moreover, the sensor spring is clamped and pre-stressed between the inner surface of the clutch housing and the lever element.

According to another preferred exemplary embodiment, the lever element is designed to clamp the ramp ring between the lever element and the contact plate in the axial direction when the clutch device is engaged. Furthermore, the sensor spring is preferably designed to press the lever element against the drive ring in either the wear-free or the wear-adjusted state of the clutch device, in order to clamp the drive ring in the axial direction when the clutch device is engaged.

According to another preferred exemplary embodiment, when the clutch device is worn, the lever element is designed to force the sensor spring and to suspend the clamping of the drive ring in the axial direction when the clutch device is engaged. This makes it possible to sense the clutch wear when the clutch device is engaged.

The linkage preferably has a buckling spring, which extends in the circumferential direction and which is preferably less stiff in the push direction than in the pull direction. In particular, it is advantageous if the linkage has a plurality of buckling springs distributed in the circumferential direction. Furthermore, it is advantageous if the buckling spring(s) is/are arched. A deformation of the buckling spring(s) occurs/occur, in particular in the axial direction of the clutch device, when a load is applied to the buckling spring(s) in the push direction.

According to another exemplary embodiment, the buckling spring is fastened at one of its ends to one of the two rings, preferably to the drive ring. Furthermore, it is advantageous if the buckling spring is fastened at its other end to a pushing element, which is fastened to the other of the two rings, preferably to the ramp ring. Fastenings may be frictional, positive or materially bonded.

In particular, it is advantageous if the pushing element can slide in the circumferential direction and is supported tiltably in both the axial direction and the radial direction of the clutch device on one of the two rings, preferably on the drive ring. This enables the defined guiding of the pushing element and of the entire buckling spring, particularly in the push direction, which enables a defined buckling of the buckling spring in the axial direction of the clutch device, particular in the push direction of the buckling spring.

BRIEF DESCRIPTION OF THE DRAWINGS

The present invention will be explained in greater detail below on the basis of preferred exemplary embodiments in combination with the associated figures. They show the following.

DETAILED DESCRIPTION

FIGS. 1 through 8 relate to a preferred exemplary embodiment of a clutch device 1 having a wear adjustment device 8 for a motor vehicle. Features that are not identified in the present description as essential to the invention are to be understood as optional. The following description therefore also relates to additional exemplary embodiments of the clutch device 1 and of the wear adjustment device 8 which have partial combinations of the features that will be explained below.

Figure 1:
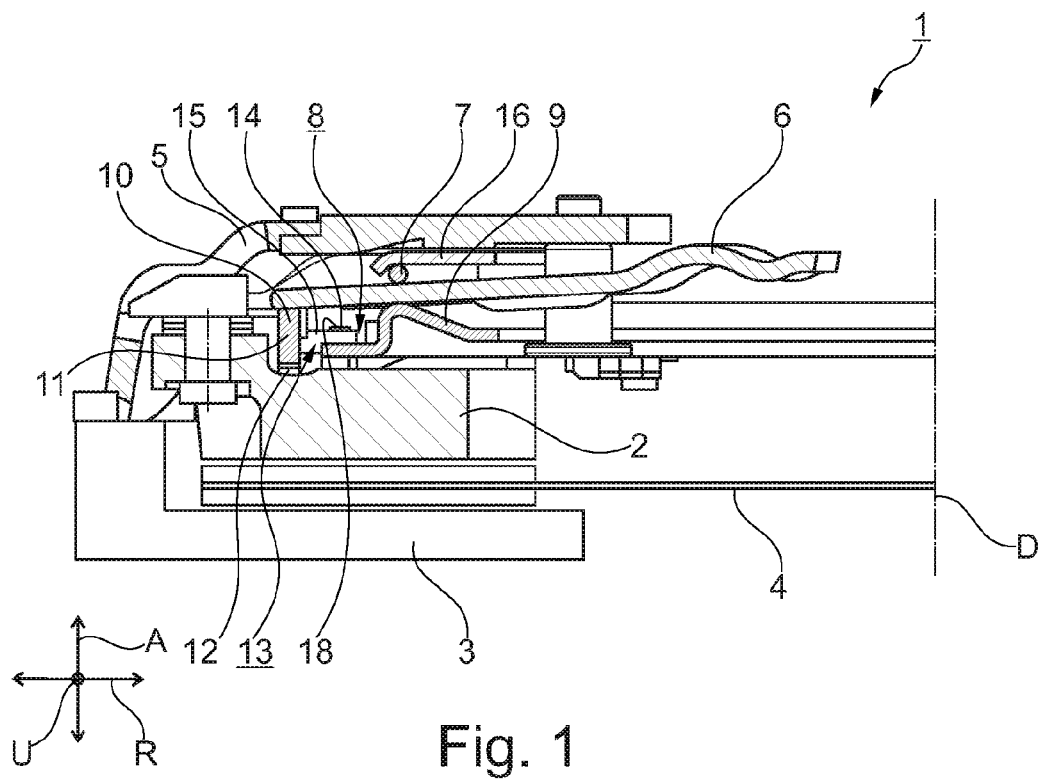
FIG. 1 an exemplary embodiment of a clutch device with a wear adjustment device which has a drive ring and a ramp ring which is linked by means of buckling springs, in a sectional view, FIG. 2 a perspective view of the clutch device from FIG. 1 with a partially cutaway wear adjustment device, seen from the direction of the actuator device, FIG. 3 a perspective view of the clutch device from FIG. 1 with a partially cutaway wear adjustment device, seen from the direction of the clutch plate, FIG. 4 a sectional view of the clutch device from FIGS. 1 through 3 in the engaged, non-worn state, FIG. 5 a sectional view of the clutch device from FIGS. 1 through 3 in the disengaged, non-worn state, FIG. 6 a sectional view of the clutch device from FIGS. 1 through 3 in the engaged, worn state, FIG. 7 a detail view of the wear adjustment device of the clutch device from FIGS. 1 through 3, and FIG. 8 a detail view of the wear adjustment device of the clutch device from FIGS. 1 through 3 with the buckling spring buckled.
Figure 2:
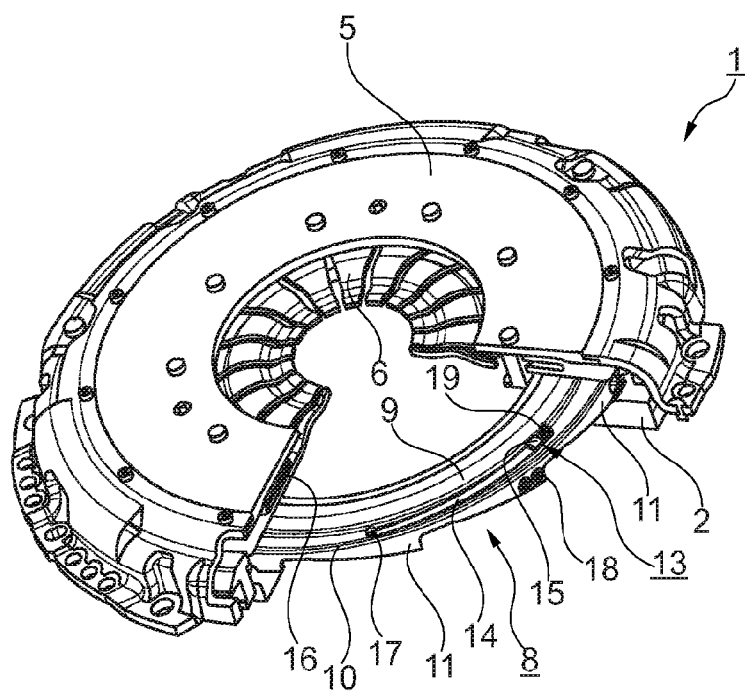
Figure 3:
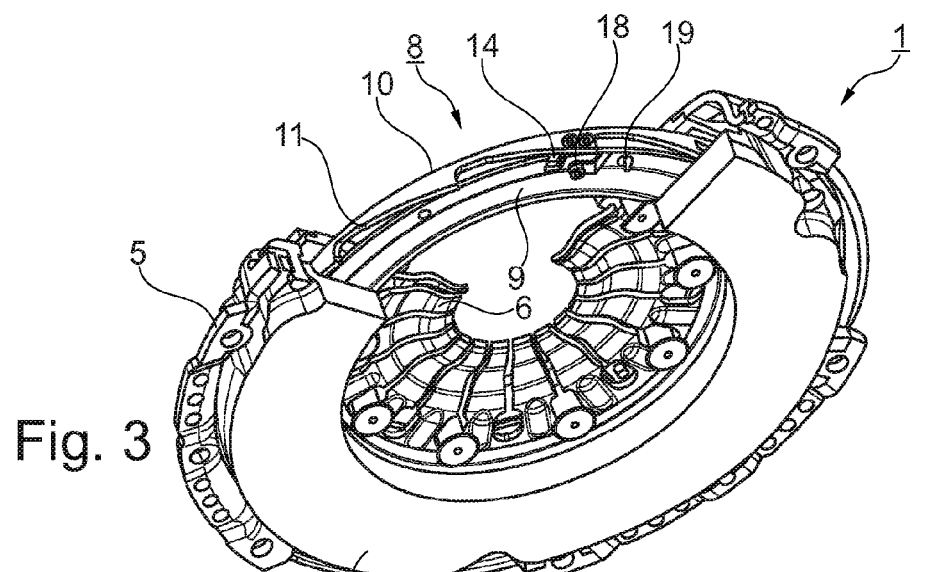

The clutch device 1 depicted in FIGS. 1 through 3 is supported so that it can rotate around an axis of rotation D, and has at least one contact plate 2, at least one counter-pressure plate 3 and at least one clutch plate 4 which is situated between the contact plate 2 and the counter-pressure plate 3 in axial direction A of the clutch device 1. The counter-pressure plate 3 is solidly connected to the clutch housing 5, in particular with screws. The contact plate 2 is supported non-rotatingly in the clutch housing 5, and is movable to a limited extent in axial direction A of the clutch housing. In particular, the pressure plate 2 is attached non-rotatingly in the clutch housing 5 by means of a plurality of leaf springs (not shown), and is pre-tensioned away from the counter-pressure plate 3, that is, in the upward direction in relation to FIG. 1.

Moreover, the clutch device 1 has a lever element 6, which may be designed as a diaphragm spring for a normally engaged clutch device 1 depicted in FIGS. 1 through 3 and as a lever spring for a normally disengaged clutch device 1. The lever element 6 is supported on the housing side, and is operable by an actuator device. The support on the housing side may be provided for example by a pivot support 7 attached to the clutch housing 5, whereby the lever element 6 is tiltably suspended. Alternatively or in addition, it is possible that parts of the wear adjustment device 8 which will be explained below, for example a drive ring 9 and/or a sensor spring 16, form the pivot support 7. The lever element 6 is operable by the actuator device by means of lever tips, which are positioned in radial direction R of the clutch device 1 on the inner side of the preferably essentially ring-shaped lever element 6.

In its radial outer area, the lever element 6 has a force rim. By means of a ramp ring 10, which is assignable to the wear adjustment device 8, the lever element 6 acts indirectly on the contact plate 2, in that the force rim of the lever element 6 is in contact with a surface of the ramp ring 10 on the lever element side, facing away from the contact plate 2, and exerts pressure on the ramp ring 10, and by means of the ramp ring 10 on the contact plate 2, when the clutch device 1 is in the engaged state.

In the normally engaged clutch device 1, depicted in FIGS. 1 through 3, the effective force of the lever element 6 in the form of a diaphragm spring outweighs the opposing force of the leaf springs, while in a normally disengaged clutch device 1 the opposing force of the leaf springs outweighs the effective force of the lever element 6 in the form of a lever spring. Accordingly, actuation of the diaphragm spring of the normally engaged clutch device 1 results in disengagement of the clutch device 1 through tipping or snap-over of the diaphragm spring, that is, lifting of the contact plate 2 and distancing of the contact plate 2 from the counter-pressure plate 3, while actuation of the lever spring in a normally disengaged clutch device 1 results in engaging of the clutch device 1 by tipping the lever spring.

With the clutch device 1 engaged, torque is transferred frictionally to the clutch plate 4 from the input side of the clutch device 1, for example from a dual-mass flywheel, through the clutch housing 5 and both the counter-pressure plate 3 and the contact plate 2, both of which are connected non-rotatingly to the clutch housing 5. From the clutch plate 4, which is frictionally clamped between the counter-pressure plate 3 and the contact plate 2, the torque is transferred to the output side of the clutch device 1, for example to an input shaft of a transmission.

Since, due to the frictional engagement, both the friction linings of the clutch plate 4, and also to a lesser degree the friction surfaces of the counter-pressure plate 3 and of the contact plate 2 are subject to wear, over the lifetime of the clutch device 1 the contact plate 2 must be moved closer and closer to the counter-pressure plate 3 in order to compensate for the loss of thickness of the friction linings and of the thickness of the friction surfaces in axial direction A, and to be able to produce frictional engagement and to engage the clutch device 1. To this end, the wear adjustment device 8 already mentioned earlier is constructed in the clutch device 1.

In addition to the ramp ring 10, by which the clutch wear can be adjusted for, the wear adjustment device 8 has the drive ring 9, by which the clutch wear can be sensed. The drive ring 9 is preferably situated inside the ramp ring 10 in radial direction R. The drive ring 9 is situated so that it is rotatable around the axis of rotation D and is clampable in axial direction A. Similarly, the ramp ring 10 is situated so that it is rotatable around the axis of rotation D and is clampable in axial direction A. The ramp ring 10 is connected to the drive ring 9 by means of a link 13 which transfers torque and permits limited relative travel in circumferential direction U of the clutch device 1. The rigidity of the link 13 in circumferential direction U is dependent on the direction.

Furthermore, the wear adjustment device 8 has the sensor spring 16, which is designed to clamp the drive ring 9 in axial direction A when the clutch device 1 is engaged, in either the wear-free or the wear-adjusted state of the clutch device 1. To this end, the sensor spring 16 may rest directly or indirectly, for example by means of a wire ring preferably belonging to the pivot support 7, against a surface of the lever element 6 lying opposite the drive ring 9 in axial direction A, or may act on that surface. The contact with or acting on the lever element 6 preferably occurs at essentially the same radius as the contact of the drive ring 9 on the lever element 6. Furthermore, the sensor spring 16 is clamped and braced in axial direction A between an inner side of the clutch housing 5 and the surface of the lever element 6 facing away from the contact plate 2 or the clutch plate 4.

The lever element 6 is designed to clamp the ramp ring 10 in axial direction A between the lever element 6 and the contact plate 2 when the clutch device 1 is engaged. The sensor spring 16 is designed to press the lever element 6 against the drive ring 9 in either the wear-free or the wear-adjusted state of the clutch device 1, in order to clamp the drive ring 9 in axial direction A when the clutch device 1 is engaged. Furthermore, the lever element 6 is designed to force the sensor spring 16 when the clutch device 1 is worn, in order to suspend the clamping of the drive ring 9 in axial direction A when the clutch device 1 is engaged.

The ramp ring 10 has ramps 11, which are arranged one after the other on the ramp ring 10 in circumferential direction U of the clutch device 1 and are supported so that they can slide on corresponding opposing ramps 12 of the pressure plate 2. The opposing ramps 12 are preferably set into the contact plate 2, but may also be designed as a separate component which is connected to the contact plate 2. The turning of the ramp ring 10 causes the ramps 11 of the ramp ring 10 to slide up on the opposing ramps 12 of the contact plate 2, whereby the distance between the friction surface of the contact plate 2 with which the contact plate 2 comes into contact with the clutch plate 4, and the surface of the ramp ring 10 facing away from the contact plate 2, increases. This results in the lever element 6 standing up less strongly when the clutch device 1 engages, and thus the clutch wear, in particular the wear of the clutch plate 4, can be adjusted for.

Figure 8:
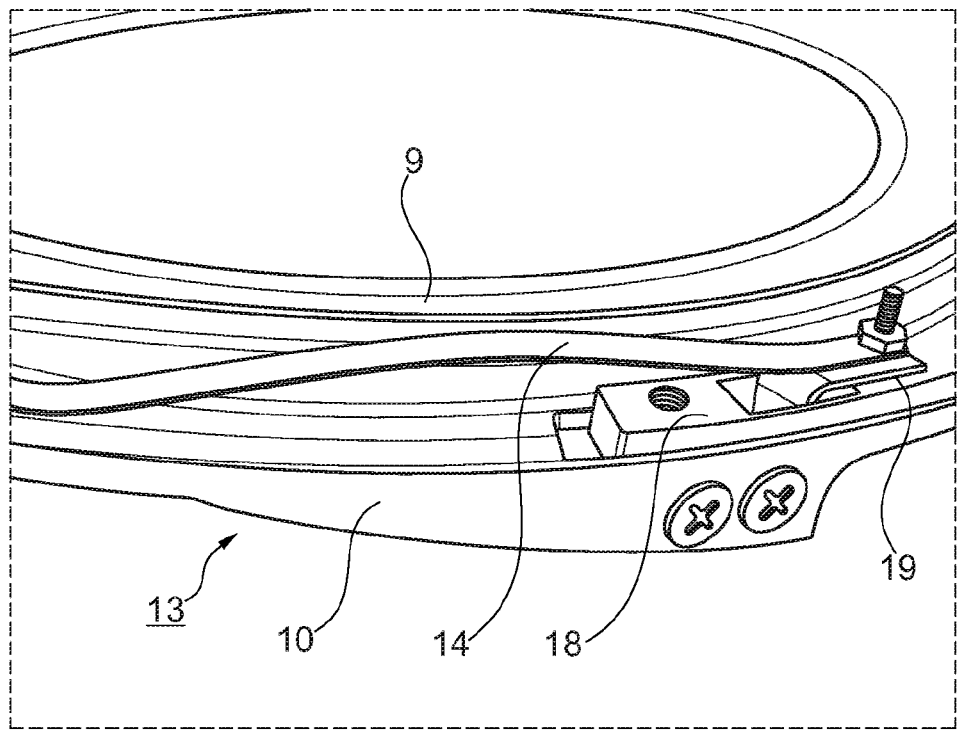

The connection 13 has a plurality of buckling springs 14 which extend in circumferential direction U, and which are less stiff in the push direction than in the pull direction. This results in the buckling springs 14 buckling in axial direction A when they are under pressure in circumferential direction U, as depicted in FIG. 8.

In particular, it is advantageous if the buckling springs 14 are in the form of arcs, in particular circular arc segments, and run essentially in radial direction R between the drive ring 9 on the one side and the ramp ring 10 on the other side. Therefore, it is particularly advantageous if the radius of the arc segments of the buckling springs 14 falls between the radius of the drive ring 9 and the radius of the ramp ring 10.

Each of the buckling springs 14 is attached at one of its ends to the drive ring 9 by a first fastener 17. Furthermore, each of the buckling springs 14 is attached at its other end to a pushing element 15. It must be noted here that the relevant buckling spring 14 and the relevant pushing element 15 may also be designed as one component.

Each of the pushing elements 15 is preferably essentially S-shaped, when viewed in radial direction R of the clutch device 1, and is attached to the ramp ring 10 by a second fastener 18. For this purpose, it is particularly advantageous if the ramp ring 10 has inward-pointing radial projections in radial direction R of the clutch device 1, to each of which one of the pushing elements 15 is attached by one end of the S shape, while the buckling spring 14 is attached to the other end of the S shape of the pushing element 15.

The forenamed attachments are preferably made by means of a screwed or riveted connection of the buckling spring 14 or pushing element 15 to the respective component, but may also be accomplished, for example, by attaching the buckling spring 14 or pushing element 15 to the relevant component.

In addition to attaching the pushing element 15 to the ramp ring 10, in particular to a radial projection of the ramp ring 10, the pushing element 15 is supported on the drive ring 9 by a guide 19 so that it can slide in circumferential direction U of the clutch device 1. The sliding support of the pushing element 15 on the drive ring 9 is preferably accomplished at the end of the S shape at which the buckling spring 14 is attached to the pushing element 15. For example, the sliding support of the pushing element 15 on the drive ring 9 may be accomplished by an elongated hole formed in the drive ring 9 and by an essentially T-shaped section formed on the pushing element 15. It is particularly advantageous here if the pushing element 15 is supported tiltably on the drive ring 9, both in axial direction A and in radial direction R of the clutch device 1, which can likewise be achieved by the T-shaped section.

Figure 4:
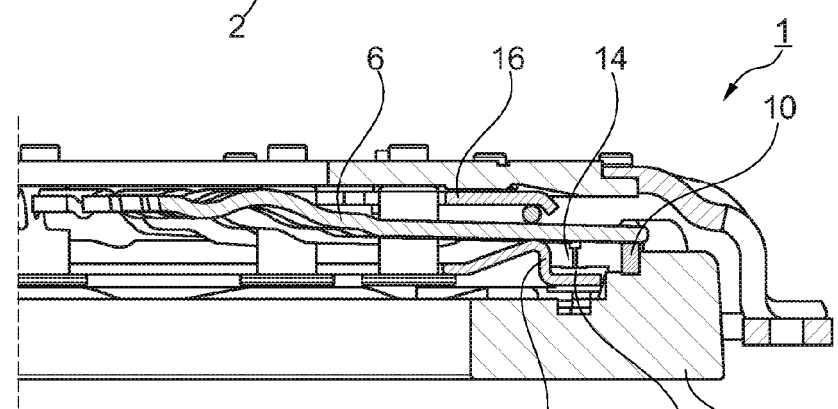
Figure 5:
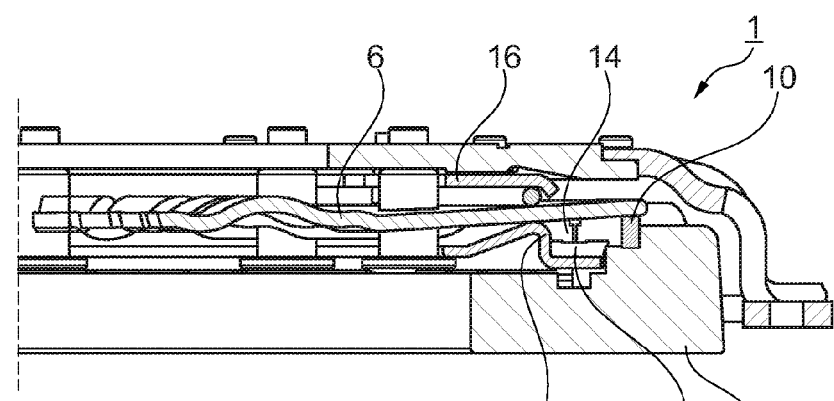
Figure 6:
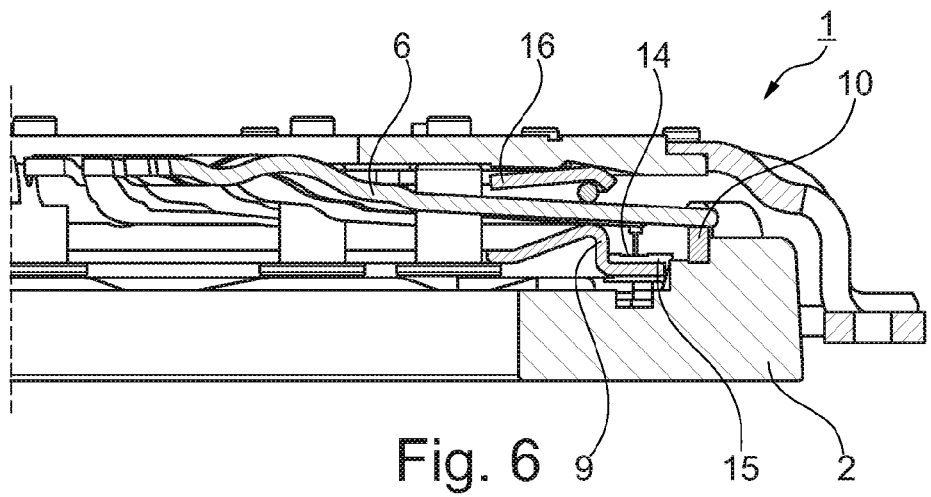
Figure 7:
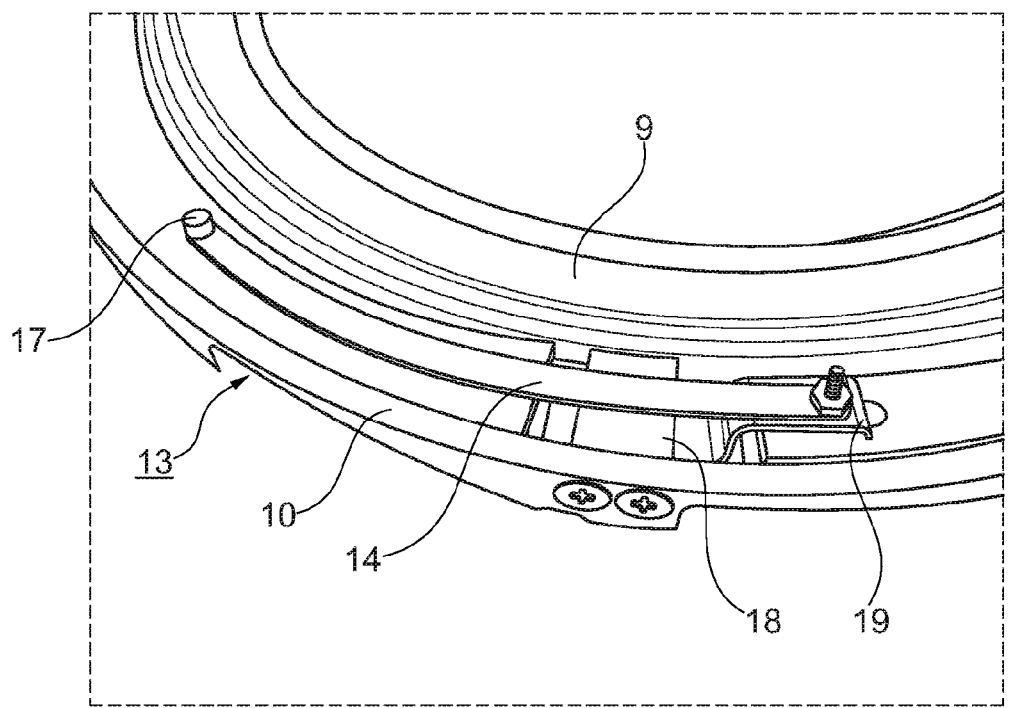

The function of the clutch device 1 will now be explained with reference to FIGS. 4 through 6. FIGS. 4 and 5 show the clutch device 1 in the wear-free state and in a wear-adjusted state, that is, after detected clutch wear has been completely adjusted for by the wear adjustment device 8. For the sake of simplicity, only the wear-free state will be discussed below. FIG. 6 shows the clutch device 1 in a worn state, that is, in a state in which the clutch wear is sufficiently great and is detected and then adjusted for by the wear adjustment device.

FIG. 4 shows the clutch device 1 in the engaged state, in which the ramp ring 10 is clamped by the lever element 6. When the clutch device 1 is wear-free, the drive ring 9 is also clamped by the sensor spring 16 acting on the lever element 6, the sensor spring force acting on the drive ring 9 being comparatively small. The buckling spring 14 buckles outward in axial direction A during engagement; that is, it is deformed in the direction of its low stiffness, and pre-stresses the drive ring 9 in circumferential direction U of the clutch device 1. The drive ring 9 does not turn, however, since the comparatively small sensor spring force is sufficient to clamp the drive ring 9 in axial direction A of the clutch device 1.

During disengagement of the clutch device 1 in the wear-free state, with reference to FIG. 5 the ramp ring 10 is relieved of load in axial direction A by the tipping or snap-over of the lever element 6. Residually, the ramp 10 is only still stressed by the force of the leaf springs (not shown) which pre-stress the contact plate 2 in the direction of disengagement. The buckling spring 14 relaxes and goes to its flat state, while the ramp ring 10, due to the comparatively high leaf spring force, is always in a position to brace the force of the previously buckled buckling spring 14, that is, the force of the buckling spring 14 which is under load in the direction of its lesser stiffness.

If the clutch device 1 is subsequently engaged again and the clutch wear is not yet sufficiently great, the sequence of events in reference to FIG. 4 starts at the beginning, with the buckling spring 14 again buckling.

FIG. 6 shows the clutch device 1 in the engaged state, when there is sufficient clutch wear present that has not yet been adjusted for; that is, when the clutch device 1 is worn.

As in FIG. 4, also in FIG. 6 the buckling spring 14 buckles as the clutch device 1 engages, that is, it becomes deformed in axial direction A of the clutch device 1 or in the direction of its lesser stiffness. When the clutch device 1 is in the worn state, the lever element 6 must stand up more strongly, so that the contact plate 2 can clamp the now thinner clutch plate 4 between the contact plate 2 and the counter-pressure plate 3 in order to be able to produce the frictional engagement. The sensor spring 16 is forced by the more strongly standing lever element 6 and suspends the clamping of the drive ring 9, so that the lever element 6 is no longer in contact with the drive ring 9, as depicted in FIG. 6. The suspension of the clamping of the drive ring 9 causes the clutch wear to be detected.

The low stiffness of the buckled buckling spring 14 is sufficient to turn the drive ring 9, which is free of clamping force in this state, in circumferential direction U of the clutch device; more precisely, to press it forward in circumferential direction U, whereupon the buckling spring 14 relaxes with the clutch device 1 in the engaged state.

When the clutch device 1 disengages, the drive ring 9 is clamped in axial direction A, that is, in circumferential direction U, by the sensor spring 16, more precisely by the sensor spring force acting on the lever element 6. The ramp ring 10 is relieved of loading in axial direction A by the lever element 6 as the clutch device 1 disengages.

The relaxed buckling spring 14, flat or no longer buckled in axial direction A of the clutch device 1, is stressed in circumferential direction U of the clutch device 1 in the direction of its high stiffness, that is, in the pull direction. In this case, the buckling spring 14 functions as a tie rod to turn the ramp ring 10 in the direction of adjustment, that is, to pull it forward, which causes the ramps 11 of the ramp ring 10 to slide up on the opposing ramps 12 on the contact plate side. Their sliding up enlarges the distance between the friction surface of the contact plate 2 on the clutch plate side and the surface of the ramp ring 10 on the lever element side as the clutch device 1 disengages, which adjusts for the clutch wear.

In the subsequent engaging processes, the enlarged distance means that the lever element 6 does not have to stand up as strongly as before in order to be able to clamp the now thinner clutch plate 4 frictionally between the contact plate 2 and the counter-pressure plate 3. When the clutch wear has been completely adjusted for, in the subsequent engagement process the sequence of events in reference to FIG. 4 begins. If the clutch wear has not yet been completely adjusted for, in the subsequent engagement process the sequence of events in reference to FIG. 6 begins until the clutch wear being detected drops below the detection threshold of the sensor spring 16. Then the sequence of events in reference to FIG. 4 described earlier begins in the subsequent engagement process.

The preceding exemplary embodiments relate to a clutch device 1, in particular a single or dual clutch, having at least one counter-pressure plate 3, a contact plate 2 that is movable relative to the counter-pressure plate 3 to a limited extent in an axial direction A of the clutch device 1 to frictionally clamp a clutch plate 4 between the counter-pressure plate 3 and the contact plate 2, and a wear adjustment device 8 to compensate for wearing of the clutch plate 4 where the wear adjustment device 8 has at least one drive ring 9 which is rotatable and is clampable in the axial direction A and at least one ramp ring 10 which is rotatable and is clampable in the axial direction A, which is connected to the drive ring 9 by means of a torque-transferring link 13 which permits limited relative travel in the circumferential direction U of the clutch device 1, where the rigidity of the link 13 in the circumferential direction U is dependent on the direction.

REFERENCE LABELS 1 clutch device
2 pressure plate
3 counter-pressure plate
4 clutch plate
5 clutch housing
6 lever element
7 pivot support
8 wear adjustment device
9 drive ring
10 ramp ring
11 ramp
12 opposing ramp
13 link
14 buckling spring
15 pushing element
16 sensor spring
17 first fastener
18 second fastener
19 guide
A axial direction
D axis of rotation
R radial direction
U circumferential direction

What is claimed is:

1. A clutch device comprising:
at least one counter-pressure plate;
a contact plate movable relative to the counter-pressure plate to a limited extent in an axial direction of the clutch device to frictionally clamp a clutch plate between the counter-pressure plate and the contact plate; and
a wear adjuster to compensate for wearing of the clutch plate, where the wear adjuster has at least one drive ring rotatable and clampable in the axial direction and at least one ramp ring rotatable and clampable in the axial direction, the ramp ring connected to the drive ring via a torque-transferring link permitting limited relative travel in two circumferential directions of the clutch device, where a rigidity of the link is different when moved in a first of the two circumferential directions than when moved in a second of the two circumferential directions, the link deforming in the axial direction during clamping of the clutch plate between the counter-pressure plate and the contact plate.

2. The clutch device as recited in claim 1 wherein the wear adjuster has a sensor spring designed to clamp the drive ring in the axial direction when the clutch device is engaged, in either a wear-free or wear-adjusted state of the clutch device.

3. The clutch device as recited in claim 1 further comprising a lever element for clamping the ramp ring in the axial direction between the lever element and the contact plate when the clutch device is engaged.

4. The clutch device as recited in claim 2 wherein the sensor spring is designed to press the lever element against the drive ring in either the wear-free or the wear-adjusted state of the clutch device in order to clamp the drive ring in the axial direction when the clutch device is engaged.

5. The clutch device as recited in claim 3 wherein the lever element is designed to force the sensor spring when the clutch device is worn, in order to suspend the clamping of the drive ring in the axial direction when the clutch device is engaged.

6. The clutch device as recited in claim 1 wherein the link has a buckling spring extending in the circumferential directions.

7. The clutch device as recited in claim 6 wherein the buckling spring has a stiffness lower in a push direction than in a pull direction.

8. The clutch device as recited in claim 6 wherein the buckling spring is arched.

9. The clutch device as recited in claim 6 wherein the buckling spring is attached at one end to one of the drive ring and the ramp ring.

10. The clutch device as recited in claim 9 wherein the buckling spring is attached at the one end to the drive ring.

11. The clutch device as recited in claim 9 wherein the buckling spring is attached at an other end to a pushing element attached to the other of the drive ring and the ramp ring.

12. The clutch device as recited in claim 10 wherein the buckling spring is attached at an other end to a pushing element attached to the ramp ring.

13. The clutch device as recited in claim 11 wherein the pushing element is slidable in the circumferential directions and is supported tiltably in both the axial direction and a radial direction of the clutch device on one of the drive and ramp rings.

14. The clutch device as recited in claim 13 wherein the pushing element is slidable in the circumferential directions and is supported tiltably in both the axial direction and the radial direction of the clutch device on the drive ring.

15. A single or dual clutch comprising the clutch device as recited in claim 1.

16. A clutch device comprising:
at least one counter-pressure plate;
a contact plate movable relative to the counter-pressure plate to a limited extent in an axial direction of the clutch device to frictionally clamp a clutch plate between the counter-pressure plate and the contact plate; and
a wear adjuster to compensate for wearing of the clutch plate, where the wear adjuster has at least one drive ring rotatable and clampable in the axial direction and at least one ramp ring rotatable and clampable in the axial direction, the ramp ring connected to the drive ring via a plurality of circumferentially spaced torque-transferring links permitting limited relative travel in two circumferential directions of the clutch device, where a rigidity of each of the links is different when moved in a first of the two circumferential directions than when moved in a second of the two circumferential directions, wherein each link has a buckling spring extending in the circumferential directions from the ramp the drive ring.

17. A clutch device comprising:
at least one counter-pressure plate;
a contact plate movable relative to the counter-pressure plate to a limited extent in an axial direction of the clutch device to frictionally clamp a clutch plate between the counter-pressure plate and the contact plate; and
a wear adjuster to compensate for wearing of the clutch plate, where the wear adjuster has at least one drive ring rotatable and clampable in the axial direction and at least one ramp ring rotatable and clampable in the axial direction, the ramp ring connected to the drive ring via a torque-transferring link permitting limited relative travel in two circumferential directions of the clutch device, where a rigidity of the link is different when moved in a first of the two circumferential directions than when moved in a second of the two circumferential directions, wherein the link has a buckling spring extending in the circumferential directions, wherein the buckling spring is attached at one end to one of the drive ring and the ramp ring, wherein the buckling spring is attached at an other end to a pushing element attached to the other of the drive ring and the ramp ring, wherein the pushing element is slidable in the circumferential directions and is supported tiltably in both the axial direction and a radial direction of the clutch device on one of the drive and ramp rings.

* * * * *